United States Patent [19]

Sago et al.

[11] Patent Number: 4,650,621

[45] Date of Patent: Mar. 17, 1987

[54] METHOD OF PREPARING HEAT EXCHANGE ELEMENT

[75] Inventors: Yoshiharu Sago, Nagoya; Masaji Kurosawa, Chiba; Nobutaka Kanamori, Tokyo, all of Japan

[73] Assignees: Toho Gas Co., Ltd., Nagoya; Nichias Corporation; Honshuseishi Kabushiki Kaisha, both of Tokyo, all of Japan

[21] Appl. No.: 798,028

[22] Filed: Nov. 14, 1985

Related U.S. Application Data

[62] Division of Ser. No. 645,354, Aug. 29, 1984, Pat. No. 4,595,403.

[30] Foreign Application Priority Data

Sep. 2, 1983 [JP] Japan .................................. 58-160299

[51] Int. Cl.⁴ ............................ B31F 1/20; C08K 3/34
[52] U.S. Cl. ..................................... 264/62; 162/152; 427/344; 427/387; 427/397.7; 427/376.2
[58] Field of Search .................. 55/389, 390; 162/152, 162/181.6; 264/62; 427/344, 387, 397.7, 376.2

[56] References Cited

U.S. PATENT DOCUMENTS

| | | | |
|---|---|---|---|
| 2,998,328 | 8/1961 | Munger et al. | 427/344 |
| 3,382,141 | 5/1968 | Arledter et al. | 55/389 |
| 3,418,203 | 12/1968 | Asunmaa | 162/156 |
| 3,526,322 | 9/1970 | Burroughs | 55/389 |
| 4,025,668 | 5/1977 | Norback | 427/376.2 |
| 4,134,743 | 1/1979 | Macriss et al. | 55/390 |
| 4,210,697 | 7/1980 | Adiletta | 162/156 |
| 4,391,667 | 7/1983 | Vangbo et al. | 55/389 |
| 4,421,702 | 12/1983 | Oda et al. | 264/62 |

FOREIGN PATENT DOCUMENTS 19548 2/1979 Japan .

*Primary Examiner*—Tim Miles
*Attorney, Agent, or Firm*—Wenderoth, Lind & Ponack

[57] ABSTRACT

The present invention provides a method of preparing a heat exchange element comprising a molded product of a paper-like material made of ceramic fibers as a matrix, the interstices among the ceramic fibers being uniformly filled with molecular sieve particulates having an average particle diameter of 5.5μ or less, the ceramic fibers and the molecular sieve particulates being bound by a silicic acid gel.

5 Claims, 5 Drawing Figures

(3000X)

(3000X)

METHOD OF PREPARING HEAT EXCHANGE ELEMENT

This application is a division of Ser. No. 645,354 filed Aug. 29, 1984, now U.S. Pat. No. 4,595,403.

BACKGROUND OF THE INVENTION

The present invention relates to heat exchange between gases, particularly to total heat exchange elements used for heat as well as moisture exchange and to a method of their preparation.

Metal foils or screens have been used in matrixes as the total heat exchange elements for heat exchangers (hereinafter referred to simply as heat exchange elements) to carry out the exchange of heat or moisture between gases. However, elements using paper made from asbestos, fiber glass, ceramic fibers, etc. have great capacity to hold hygroscopic materials for forming moisture exchange abilities, they are light and further they are excellent in that they display a high degree of service durability even when used in the heat exchange of gases containing acidic components. Upon investigating this from the aspect of hygroscopic material it will be found that in addition to lithium chloride and silica gel, molecular sieves are also used as described in Japanese Patent Application Laid Open No. 54-19548. In comparison to those using lithium chloride as the hygroscopic material, heat exchange elements using molecular sieves show superior results in such points as:

1. they have little deterioration in their hygroscopic capacity over time;
2. since there is little deterioration in their hygroscopic capacity upon regeneration, even when directly using city gas as the combustion gas, regeneration can be accomplished with less heat energy required;
3. they don't get wet with liquid even when treating very humid air.

They are also clearly superior in that there is very little deterioration over time, even in comparison to those elements using silica gel as the hygroscopic material.

However, in cases where paper, which has the many advantages as mentioned above, is to be used as a carrier, conventional heat exchange elements using molecular sieves were the result of a process of mixing the paper making materials and the molecular sieve particulates and then making the paper sheets from this mixture. However, they would not display the moisture absorbing capabilities that could be expected from the amount of molecular sieve carried, perhaps because the molecular sieve agglomerates during the paper making stage thereby forming coarse secondary particles.

SUMMARY OF THE INVENTION

The object of the present invention therefore, is to solve the problems such as those mentioned above, which arise in the moisture absorbing capacity of heat exchange elements, using paper as a carrier and a molecular sieve as the moisture absorbing material, in order to provide a high capacity heat exchange element superior in both heat resistance and moisture absorbency.

This object is achieved in accordance with the present invention, which provides a heat exchange element comprising either a paper-like material made of ceramic fibers or molded product thereof as a matrix, the interstices among the ceramic fibers being uniformly filled with molecular sieve particulates having an average particle diameter of $5.5\mu$ or less, the ceramic fibers and the molecular sieve particulates being bound by a silicate gel.

DETAILED DESCRIPTION OF THE INVENTION

Figure 1:
FIG. 1 as well as FIG. 2 are electron-microscopic photographs of a cross section and a surface of a heat exchange element of the present invention.

Since it is difficult to prepare the element according to the present invention by the conventional process of simultaneously carrying out the making of the paper sheet of ceramic fibers and filling the molecular sieve therein, the heat exchanger element of the present invention can be prepared only by the method of preparation explained in detail below.

Namely, a water resistant, bulky paper sheet is prepared using an organic binder and a fiber mixture containing primarily ceramic fibers and other organic fibers, impregnating the resulting paper sheet with an aqueous dispersion of molecular sieve particulates i.e. fine particles, molding the impregnated paper, then impregnating the paper with colloidal silica or ethyl silicate, converting the resultant silicon compound into silicate gel, and next firing the resultant paper to burn off any organic matter in the paper.

The processing steps of the method of preparing the heat exchanger element of the present invention will be explained in detail below. First, paper sheets are formed from a mixture of organic and ceramic fibers by a conventional procedure. As the ceramic fibers the so-called heat resistant inorganic fibers such as silica fibers, alumina fibers, alumina silicate fibers and zirconia fibers, for example FINEFLEX (product of Nichias Corp.) or REFRASEAL (product of HITCO Inc.) can be used. As the organic fibers those that are hydrophilic, dispersing well in water, and further non-thermoplastic such as for example celluloic fibers such as rayon or wood pulp are the most appropriate, however various synthetic fibers such as those of vinylon, polyethylene, acryl, polyester, etc. can also be utilized. From the standpoint of aqueous dispersibility and paper strength a fineness of 3 deniers or less and fiber length of about 3–10 mm is desirable.

The aqueous dispersion used for making paper out of the above fiber-like raw materials contains the organic binder. This organic binder is used over and over when making paper from this type of fiber and it is effective both to raise the dispersibility of the fiber in the paper making step and to raise the form stability of the paper through fixing the structure of the paper by bonding the fibers together after the paper sheet is formed. However it is desirable that at least part of the organic binder should convert into a substantially water insoluble state by either drying the paper after the paper sheet is made or by subjecting it to a further treatment required after the drying in order for the paper sheet to become water resistant enough to withstand the process of impregnating the paper sheet with the aqueous dispersion of molecular sieve (namely, to have a wet strength desirably 0.2 kg/15 mm or greater). For example binders of acrylic resins, vinyl acetate resins, ethylene-vinyl acetate resins, etc. are effective in obtaining water resistant paper because they become water insoluble themselves by the applied heat for drying the paper. On the other hand polyvinyl alcohol resins, CMC, starch, etc. are water soluble even after drying and so ceramic fiber paper which only uses them as the binder would have exceptionally poor shape retention during the step of impregnating the aqueous dispersion of molecular sieve, because these binders swell and dissolve in water. Consequently, when using these water soluble binders, they should be selected from those which can be converted to a water insoluble state after drying by heating or they should be employed after subjecting them to any further treatment which converts the binder to a water insoluble state, for example, drying at about 200° C. or subjecting them to formalization for the polyvinyl alcohol. In cases where the organic binder used in the paper sheet making step cannot form a water resistant paper, the paper can be made water resistant by subjecting it to a step of depositing a binder of a water resistant resin such as urea resins, melamine resins, or phenol resins on the prepared paper sheet. In any case the organic binder may take the form of aqueous solutions, emulsions, powders, fibers, etc.

The appropriate ratios of the paper making raw materials are 80-96 wt.% ceramic fibers, 2-10 wt. %, preferably 3-6 wt. % organic fibers, 2-10 wt. %, preferably 3-6 wt. % organic binder. The paper making and molding steps which take place before the burn off mentioned below, both become easier as the organic material increases, but since this is apt to result in lower strength of the finished product, it is preferable that they amount to within 15 wt. % in the total amount.

Further, in addition to those paper making raw materials mentioned above, auxiliaries normally used in making such paper sheet may be used. The paper making raw materials are made in the conventional manner into a slurry having a concentration of about 0.1-0.3% and then made into a comparatively bulky paper sheet preferably having a thickness of about 0.15-0.50 mm and a density of about 0.2-0.4 g/cm$^3$ (both values being for a dried product) using either a rectangular or cylindrical type paper making machine and then drying. When only water soluble binders such as polyvinyl alcohol resins, CMC or starch are used as the organic binder a further step must be carried out to improve their water resistance for the reasons explained above.

The impregnation of the molecular sieve aqueous dispersion into the resultant water resistant bulky paper is next carried out. The most important characteristic of the aqueous dispersion of molecular sieve used in this process is the particle size of the molecular sieve. That is, the molecular sieve must be stably dispersed as minute particles (including secondary agglomerates) within the dispersion.

It is desirable to have substantially no coarse particles of more than 10$\mu$ present (i.e. less than about 5%, with less than 3% being particularly desirable) and further to be in a dispersion state where the average particle diameter is not greater than 5.5$\mu$. If coarse particles should exist it is not only difficult to perform uniform impregnation due to sedimentation of said coarse particles before impregnation of the paper with the aqueous dispersion, but also there is an increase in the amount of molecular sieve which only adheres to the surface without being able to penetrate the fiber interstices of the paper, thereby reducing the molecular sieve which is carried in a stable state within the structure of the paper. Even higher amounts of molecular sieve can be adhered to the surface by repeating the impregnation process, but in comparison to cases using the same amount of molecular sieve, but which is sufficiently minute, the sheet only becomes thicker, not only making precise molding difficult, but also increasing the amount of molecular sieve that falls off during processing or use, providing a product with reduced hygroscopic capability and durability.

Figure 3:
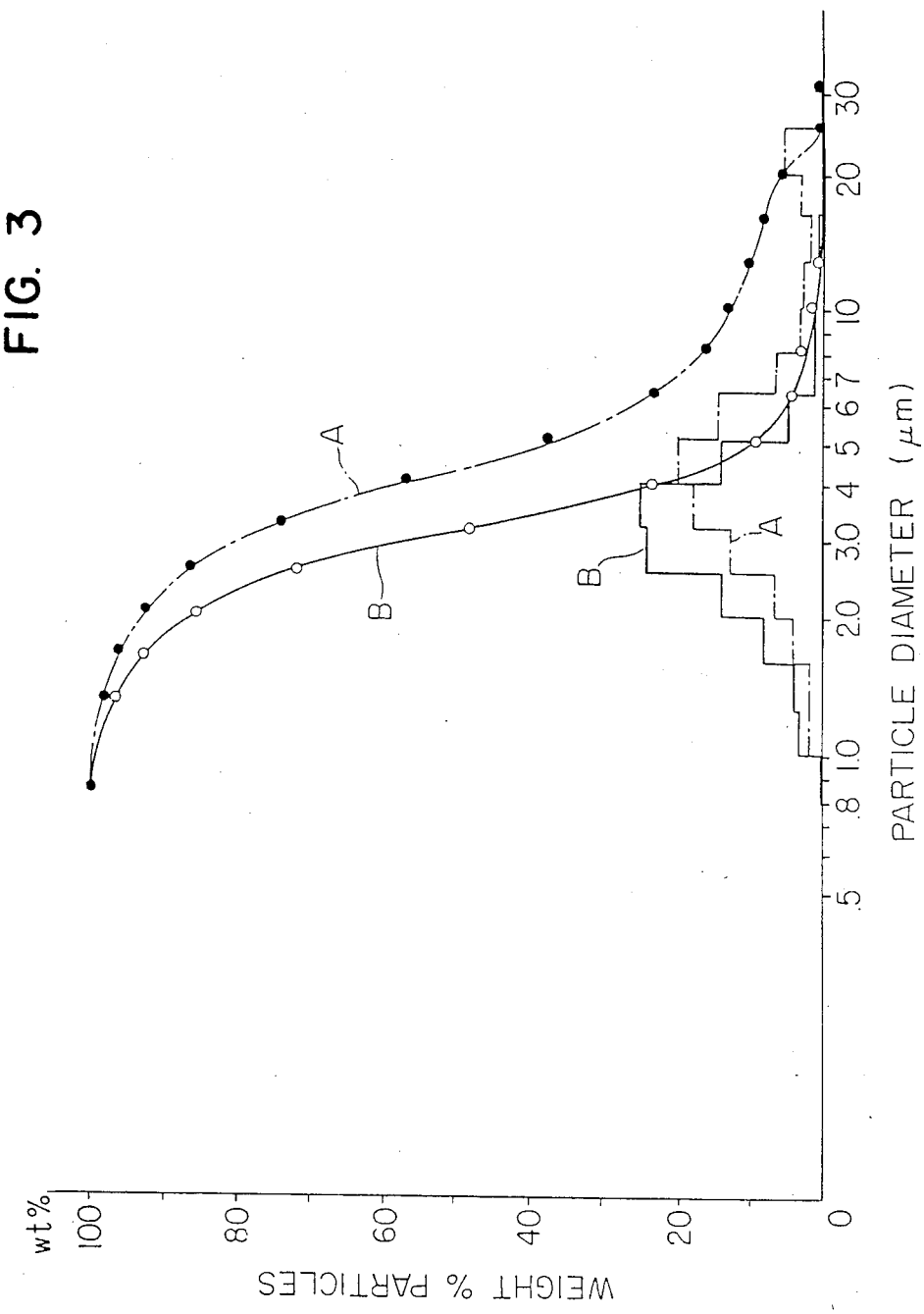
FIG. 3 is an example of a molecular sieve particle distribution graph.

Even in the case of commercial molecular sieve having the most minute grade of particles of nominal particle size 10$\mu$ or less, as can be clearly seen from the particle distribution graph A in FIG. 3 there are a significant number of particles with diameters greater than 10$\mu$ when this is dispersed in water (said graph A showing about 15%) and it can be inferred that the majority of them are secondary agglomerates. It can be believed that these secondary paritcles will increase with time. Consequently, even when using a sufficiently finely powdered molecular sieve, the preparation of an aqueous dispersion is carried out by milling the coarse particles along with disagglomerating agglomerated particles in the presence of a dispersion stabilizing agent in a ball mill so as to disperse the molecular sieve particles into primary particles or very close to that level. As the dispersion stabilizing agent for this purpose various products may be utilized, but casein, soy bean protein, etc. having a protective colloid forming ability display particularly superior dispersion stabilization abilities, the preferable amounts to be added being 4-30 wt. % of the molecular sieve, preferably 5-10 wt. %. The particle size distribution of the molecular sieves thus obtained is depicted as B in FIG. 3 which does not show the existence of particles having particle sizes essentially greater than 10$\mu$.

Besides the above mentioned features regarding the particle diameter, it is of course preferable for the absorbency of the molecular sieve to be substantially large. Superior absorbing capacity is achieved by molecular sieve having a pore size of about 3-13 angstroms, examples of such a commercial molecular sieve being Union Carbide's molecular sieve '4 A' (powder) and '13X' (powder).

The concentration of the molecular sieve in the dispersion may suitably be in the range of 20-50 wt. %. In addition to the above dispersion stabilizing agent, any ancillary component can be appropriately added to the molecular sieve dispersion which is effective in enhancing its permeability, adhesion or coating properties of the dispersion to the paper sheet and which further increases the moisture absorption capacity of the finished product.

In impregnating the molecular sieve dispersion into the paper, the method of dipping the paper into said dispersion is the most easy to perform, however the present invention is not restricted to such a method. It is desirable that the impregnated amount be such that the molecular sieve amounts to 100-170 g/m$^2$. The uniform penetration of such a large amount of molecular sieve into the inner structure of the paper by keeping it immersed in the dispersion for a sufficient period of time to allow the penetration, has for the first time become possible by using a molecular sieve particulate dispersion and a bulky, water resistant ceramic fiber paper made according to the process mentioned above. Further it is also possible to impregnate more than 170 g/m² of molecular sieve, but no further improvement of the moisture absorbing capacity of the product can be achieved because of the decreasing rate of availability of molecular sieve.

The impregnation of the molecular sieve dispersion must be carried out as the first process after the completion of making the water resistant paper. Not only does carrying it out after a molding process such as forming corrugations, make it difficult for the dispersion to penetrate into those portions whose structures have become dense by molding, making the impregnation liable to suffer from non-uniformity, but also the shape derived from the molding process will be lost. On the other hand, if the molecular sieve is filled within the structure of the paper before the molding step, the moldability of the ceramic fiber paper, which is inherently rigid and thereby difficult to mold because of the integral ceramic fibers is remarkably improved with the result that the operation as well as the molding of paper becomes easier and the the shape integrity during any further processing is attained, both in combination with the effect of the added organic fibers.

Figure 4:
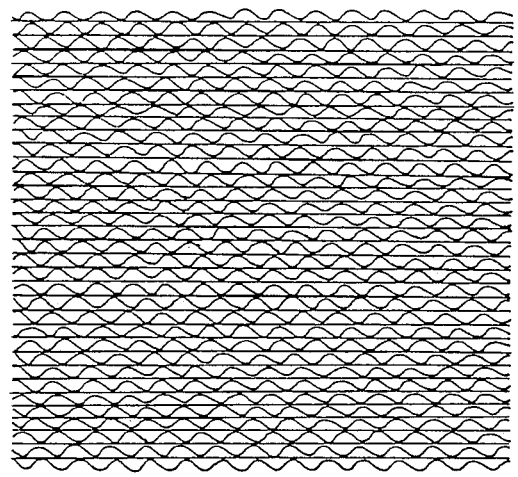
FIG. 4 is an open face partial view showing the molded state of a heat exchange element according to the present invention.

Paper that has finished the impregnation of the molecular sieve dispersion will then be molded according to need. A molding operation or operations such as by way of example corrugation using a corrugating machine for making cardboard, a molding process which produces any shape desirable for a heat exchange element, examples of which may be wind-up processes for preparing heat exchange elements for a rotating type heat exchanger or the adhesion processing of the same type of molded paper sheets or of the molded sheets with non-molded sheets are applied. FIG. 4 shows an example of a condition after the molding process. Organic adhesives are not suitable as adhesives here so an inorganic adhesive that can adhere while withstanding the burn-off process described below must be used. Preferably, a specific adhesive is one of the following:

1. One of refined bentonite or one having titanium oxide, silica powder, aluminasol, etc. added thereto.
2. One derived from silica powder and alumina powder.
3. One having colloidal silica or ceramic fibers added to alumina powders and kaolin.
4. One derived from zirconia powders and colloidal silica.

(any of the above using water as the diluent)

As commercial products there can be mentioned 'FF Adhesive' (NICHIAS Corp.) or SUMICERUM (Sumitomo Kagakukogyo. KK.).

Further, when making materials for a slab-like heat exchange element the molding process is skipped, proceeding on to the next step.

The paper after the molding is finished or the paper completed in a slab form without being molded, is next uniformly impregnated with colloidal silica or ethyl silicate, after which the impregnated silicon compounds are converted into silicic acid gel thereby resulting in hardening.

When impregnated with colloidal silica, the above hardening is completed if dried at 150°–170° C.

When impregnated with ethyl silicate, silicic acid gel is formed within the structure of the paper by hydrolizing the ethyl silicate. For this purpose many methods can be used such as exposing either the ethyl silicate stock solution or the solution after impregnation to high temperature steam or a catalyst such as hydrochloric acid is added to the ethyl silicate solution to be impregnated and left to stand for several hours after impregnation.

In terms of ease in achieving uniform processing results the method using ethyl silicate is more preferable than the method using colloidal silica. It is desirable to carry the former process out to obtain a fixed 60–100 g of $SiO_2$ per 100 g of paper.

After the formation of the silicic acid gel the paper sheet or its molded product are fired in an oxidizing atmosphere at a temperature of about 1000° C. or below to burn off any organic matter such as the organic binder, and the organic fiber etc., whereupon the ceramic fiber becomes a matrix to which the molecular sieve particulates are bound by the silicic acid gel resulting in the heat exchange element of the present invention. The resulting heat exchange element maintains the identity of the configuration with which it was conferred during said molding process.

A heat exchange element prepared as mentioned above, is used as it is or after subjecting it to further processing such as cutting, punching or re-adhesion in order to obtain the shape, dimension and construction necessary for a suitable heat exchange element.

There are three reasons for using organic fibers which are unnecessary in the final heat exchange elements, in the above method of preparation: 1. the organic fiber through synergistic action with the organic binder, promotes the dispersion of the ceramic fibers which are rigid and which have no self-adhesiveness and enhance the paper making ability; 2. the organic fibers enhance the processability from the use of a corrugation machine and improve the shape retention of a molded product after said molding; and 3. the utilization of the molecular sieve is raised due to the minute pores that remain in the finished product after the burn-off of the organic fibers.

According to the above method of preparation a heat exchange element of the present invention with a large amount of molecular sieve securely and uniformly fixed within the sheet can be prepared easily with extremely good efficiency and further without any loss of expensive molecular sieve. Also as the molding process carried out during the preparation is extremely easy even though it is an integrated rigid ceramic fiber paper that is being processed, the molding into those shapes preferable as heat exchange elements can be carried out freely.

The heat exchange element of the present invention displays superlative absorbing capability due to its containing large amounts of molecular sieve particulates with the ceramic fiber paper as a matrix, along with being a highly heat resistant product prepared from ceramic fiber, silicic acid gel and molecular sieve wherein the molecular sieve is not coated on the surface, but rather large amounts are so uniformly distributed within the sheet that it can almost be said that it is a component of the sheet itself. Therefore, even while it is being used for long periods under rigorous high temperature conditions the heat exchange element according to the present invention displays a stable capability with no fall-off due to collapse or delamination.

Figure 2:
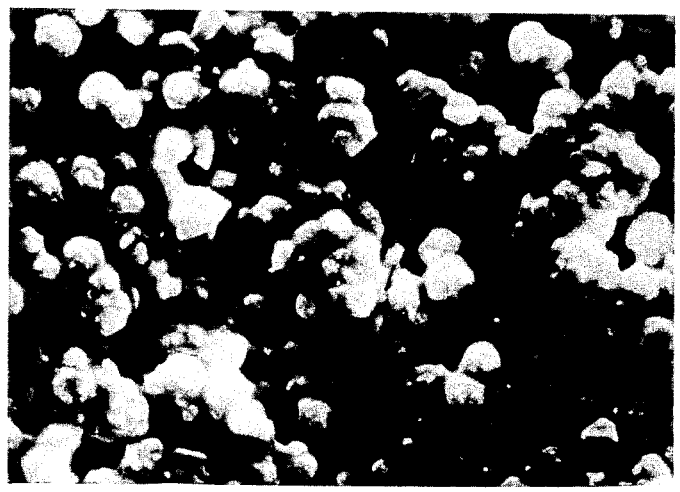

As is clear from the photographs, of FIGS. 1 and 2 the molecular sieve particulates in a heat exchange element according to the present invention do not form coarse agglomerates since the interstices between the ceramic fibers are uniformly filled and further because there are numerous minute air communicating pores which form air passing channels. The utilization coefficient of the molecular sieve is high so that the moisture absorbency capacity is superior in comparison to similar conventional heat exchange elements having the same amount of molecular sieve.

The present invention will be illustrated by the following Examples and Comparative Examples.

EXAMPLES 1, 2 AND COMPARATIVE EXAMPLES 1, 2

After dispersing part of a mixture of 90 wt. % of FINEFLEX, an alumina silica series ceramic fiber (product of NICHIAS Inc., with a thickness of 2.6–3.0 μm, length of 5–30 mm), 5 wt. % of rayon fiber (1.5 d×5 mm) and 5 wt. % of polyvinyl alcohol resin in fiber form as the organic binder, into 340 parts water, a paper sheet was prepared in a conventional method using a circular type paper making machine. After spraying a urea resin binder on the resultant paper at a rate of 2.5 g/m² the paper was passed through a molecular sieve aqueous dispersion (residence time of 10 seconds). The molecular sieve dispersion was an aqueous dispersion prepared by ball milling a molecular sieve powder (Union Carbide's '13X') as an aqueous dispersion having the composition shown in Table 1. T,160

After drying the resultant paper impregnated with molecular sieve it was corrugated using a cardboard machine at 180° C. (the height of the corrugations was 2.2 mm). Then, it was rolled up into a 500 mm diameter×200 mm high cylindrical shape, immersed in a mixed solution of 8.0 parts ethyl silicate (40% silica solids), 13 parts ethyl alcohol, 6 parts water as well as 1 part of 5% hydrochloric acid to absorb the above mixed solution in the ratio of 100 g/100 g of paper. This was then allowed to stand for 3 hours in damp air and then dried. This paper was next fired at 800° C. in an oxidizing atmosphere to burn off the organic material.

Two types of heat exchange elements were produced by the above method (Examples 1 & 2). Also, for Comparative Example 1 a heat exchange element was prepared as above except that a molecular sieve aqueous dispersion that had not been ball mill processed was used and for Comparative Example 2 a heat exchange element was also prepared as above except that the originally prepared paper was not treated with the urea resin binder.

The results are shown in Table 2.

EXAMPLE 3

A heat exchange element was prepared as in Example 1 except that after the molecular sieve impregnated paper was corrugated it was not rolled up but left in a sheet form and the subsequent procedure of ethyl silicate impregnation was carried out on said sheet form paper and further the ethyl silicate treatment was carried out by spraying, not by immersion.

These results are shown in Table 2.

EXAMPLE 4 AND COMPARATIVE EXAMPLE 3

For Example 4 a heat exchange element was prepared as in Example 3 except that a vinyl acetate was used as the binder in making the paper sheet and thereafter the urea resin binding process was not carried out.

Also for Comparative Example 3 a heat exchange element was prepared as in Example 4 except that a molecular sieve aqueous dispersion that had not been ball milled was used.

These results are shown in Table 2.

EXAMPLE 5

For Example 5 heat exchange elements were prepared as in Example 1 except that the amount of molecular sieve carried was adjusted as below by changing the concentration of the molecular sieve aqueous dispersion.

| Example | |
| --- | --- |
| 5A | 110 g/m² |
| 5B | 140 g/m² |
| 5C | 170 g/m² |

PERFORMANCE TESTING

Figure 5:
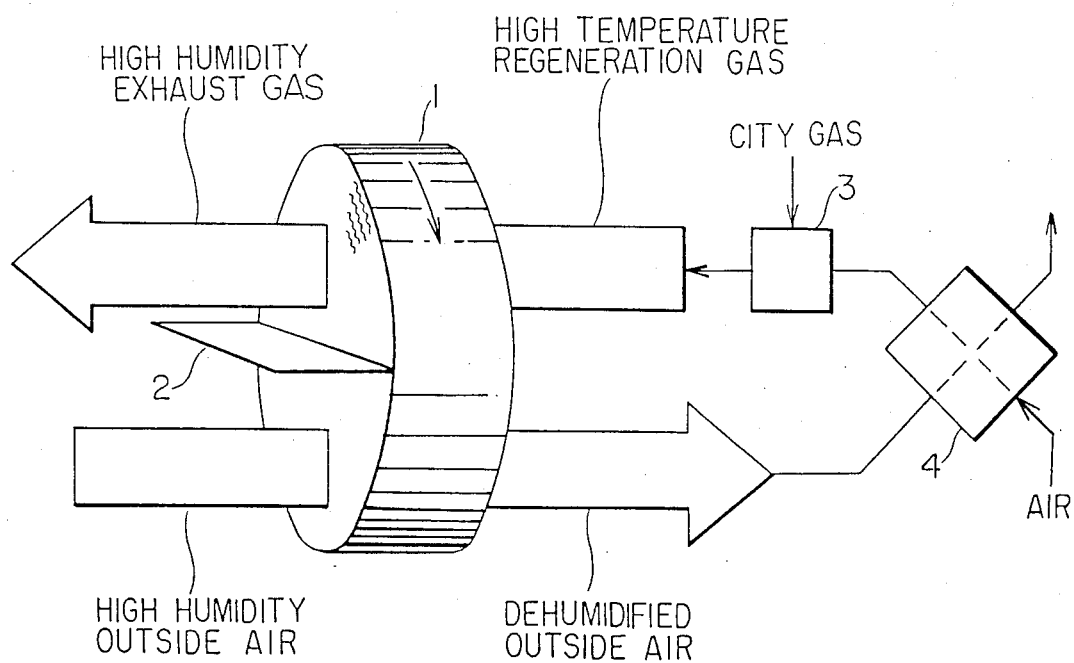
FIG. 5 is an explanatory figure of the device used in the performance testing example.

The heat exchange elements of Examples 1, 2, 5 and Comparative Example 1 were tested for their potential heat exchanging capability using the following method. FIG. 5 is a diagram explaining the testing apparatus wherein 1 is a rotating heat exchanger provided with the heat exchange element to be tested. The heat exchange element rotates ⅓ of a turn per minute in the direction of the arrow, the high humidity outside air to be dehumidified flowing from the left on the diagram into the air passage spaces below divider 2, the molecular sieve absorbing the moisture and the dehumidified outside air coming out on the right side. The portion above the divider 2 is heated by high temperature regeneration gas (a mixed gas of air and combustion gas obtained by burning city gas in heater 3, with a temp. of 150°–200° C.), discharging the moisture of the molecular sieve so that the heat exchange element once again recovers its moisture absorbing capability. Further, 4 is a sensible heat exchanger for recovering the heat held by the outside air which has been raised to about 60° C. The latent heat exchange performance was evaluated according to the amount of city gas for regeneration consumed in order to remove a unit amount of moisture from the outside air.

The results of the tests are shown in Table 3. The above city gas consumption in the same table is based on Example 5 as the relative value of 1.

TABLE 2

| | Ex. 1 | Ex. 2 | Ex. 3 | Ex. 4 | Comp. Ex. 1 | Comp. Ex. 2 | Comp. Ex. 3 |
| --- | --- | --- | --- | --- | --- | --- | --- |
| Paper Matrix | | | | | | | |
| Binder for Paper Sheet | PVA | PVA | PVA | Vinyl Acetate | PVA | PVA | Vinyl Acetate |
| Water Resist Treatment | Yes | Yes | Yes | No (no need) | Yes | No | No (no need) |
| Thickness (mm) | 0.22 | 0.22 | 0.22 | 0.20 | 0.22 | 0.21 | 0.20 |
| Basis Weight (g/m²) | 55.4 | 55.4 | 55.4 | 54.9 | 55.4 | 54.4 | 54.9 |
| Density (g/cm³) | 0.26 | 0.26 | 0.26 | 0.27 | 0.26 | 0.26 | 0.27 |

TABLE 2-continued

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Wet Strength (Kg/15 mm) | 0.45 | 0.45 | 0.45 | 0.25 | 0.45 | 0.09 | 0.25 |
| Molecular Sieve | | | | | | | |
| Method of Preparing Aqueous Dispersion | BM*1 | BM | BM | BM | Stirring | BM | Stirring |
| Avg. Particle Diameter ($\mu$m) | 3.5 | 3.5 | 3.5 | 3.5 | 5.5 | 3.5 | 5.5 |
| Particle Diameter greater than 10$\mu$ (%) | 1.5 | 1.5 | 1.5 | 1.5 | 12.5 | 1.5 | 12.5 |
| Molecular Sieve Impregnation | | | | | | | |
| Carrying Amount (g/m$^2$) | 140 | 140 | 140 | 150 | 60 | 60 | 70 |
| Workability*2 | | | | O | Δ | X | Δ |

*1 Ball Milling
*2 ⦿: Uniformly coated
O: Uniformly coated, but poor productivity
Δ: Not uniformly coated, poor productivity
X: Paper torn, coating impossible

TABLE 3

|  | Ex. 1 | Ex. 2 | Ex. 5A | Ex. 5B | Ex. 5C | Comp. Ex. 1 |
|---|---|---|---|---|---|---|
| Outside Air Temp. (°C.) | 31 | 30 | 28 | 29 | 29 | 27 |
| Outside Air Humidity ($\times 10^{-3}$ Kg/KgDa) | 15.0 | 15.1 | 10.2 | 10.4 | 10.2 | 11.3 |
| Amount of Air Dehumidified (m$^3$/h) | 1000 | 1000 | 1000 | 1000 | 1000 | 800 |
| Amount of City Gas for Regeneration Consumed (Kcal/h) | 6530 | 6600 | 6300 | 6100 | 6100 | 5100 |
| Dehumidified Air Temp. (°C.) | 33 | 33 | 31 | 31 | 31 | 31 |
| Dehumidified Air Humidity ($\times 10^{-3}$ Kg/KgDA) | 7.0 | 6.9 | 3.4 | 3.1 | 3.1 | 5.2 |
| City Gas Consumption Ratio | 1.01 | 1.00 | 1.11 | 1.00 | 1.00 | 1.29 |

We claim:

1. A method of preparing a heat exchange element comprising preparing a water resistant, bulky paper sheet using an organic binder and a fiber mixture containing primarily ceramic fibers and other organic fibers, impregnating the resulting paper sheet with an aqueous dispersion of molecular sieve particulates, molding the impregnated paper, then impregnating the paper with colloidal silica or ethyl silicate, converting the impregnated silicon compound into silicic acid gel, and next firing the resultant paper in an oxidizing atmosphere to burn off any organic matter in the paper.

2. A method of preparing a heat exchange element according to claim 1 wherein the molecular sieve particulates in the aqueous dispersion do not substantially include particles having a particle diameter of greater than 10$\mu$ and further have an average particle diameter of 5.5$\mu$ or less.

3. A method of preparing a heat exchange element according to claim 1 wherein the paper sheet to be impregnated with the aqueous dispersion of molecular sieve particulates has a density of 0.2–0.4 g/cm$^3$.

4. A method of preparing a heat exchange element according to claim 1 wherein the amounts of ceramic fibers, organic fibers and organic binder are 80–96 weight %, 2–10 weight % and 2–10 weight % respectively.

5. A method of preparing a heat exchange element according to claim 1 wherein the aqueous dispersion of molecular sieve particulates contains 5–10 weight % on the basis of the weight of the molecular sieve particulates of casein, soy bean protien, etc. having protective colloid forming ability as a dispersion stabilizing agent.

* * * * *